United States Patent [19]
Corwin et al.
[11] 3,735,027
[45] May 22, 1973

[54] DECODING SCRAMBLED TELEVISION

[75] Inventors: Jordan J. Corwin, Levittown; William J. Shanahan, Northport, both of N.Y.

[73] Assignee: Skiatron Electronics Television Corporation, New York, N.Y.

[22] Filed: Nov. 2, 1970

[21] Appl. No.: 86,115

[52] U.S. Cl. .................................178/5.1, 178/7.5 R
[51] Int. Cl. ...............................................H04n 1/44
[58] Field of Search .............................178/5.1, 7.5 R

[56] References Cited

UNITED STATES PATENTS

| | | | |
|---|---|---|---|
| 2,612,552 | 9/1952 | Crotty et al. | 178/5.1 |
| 3,538,243 | 11/1970 | Shanahan et al. | 178/5.1 |

*Primary Examiner*—Benjamin A. Borchelt
*Assistant Examiner*—S. C. Buczinski
*Attorney*—Cushman, Darby & Cushman

[57] ABSTRACT

A scrambled television decoder and its installation to a conventional television receiver by merely making a direct connection to the socket of the cathode ray tube so as to intercept only the single line that normally carries the video signals to the beam intensity control element. Signals are generated without direct connection to the television receiver, by placing a neon glow discharge tube adjacent the electromagnetic deflection coil, the neon tube being connected internally to the decoder to the relaxation oscillator and monostable multivibrator, the output of which is connected through the cathode ray tube socket to the appropriate control element for regular blanking purposes.

32 Claims, 1 Drawing Figure

PATENTED MAY 22 1973 3,735,027
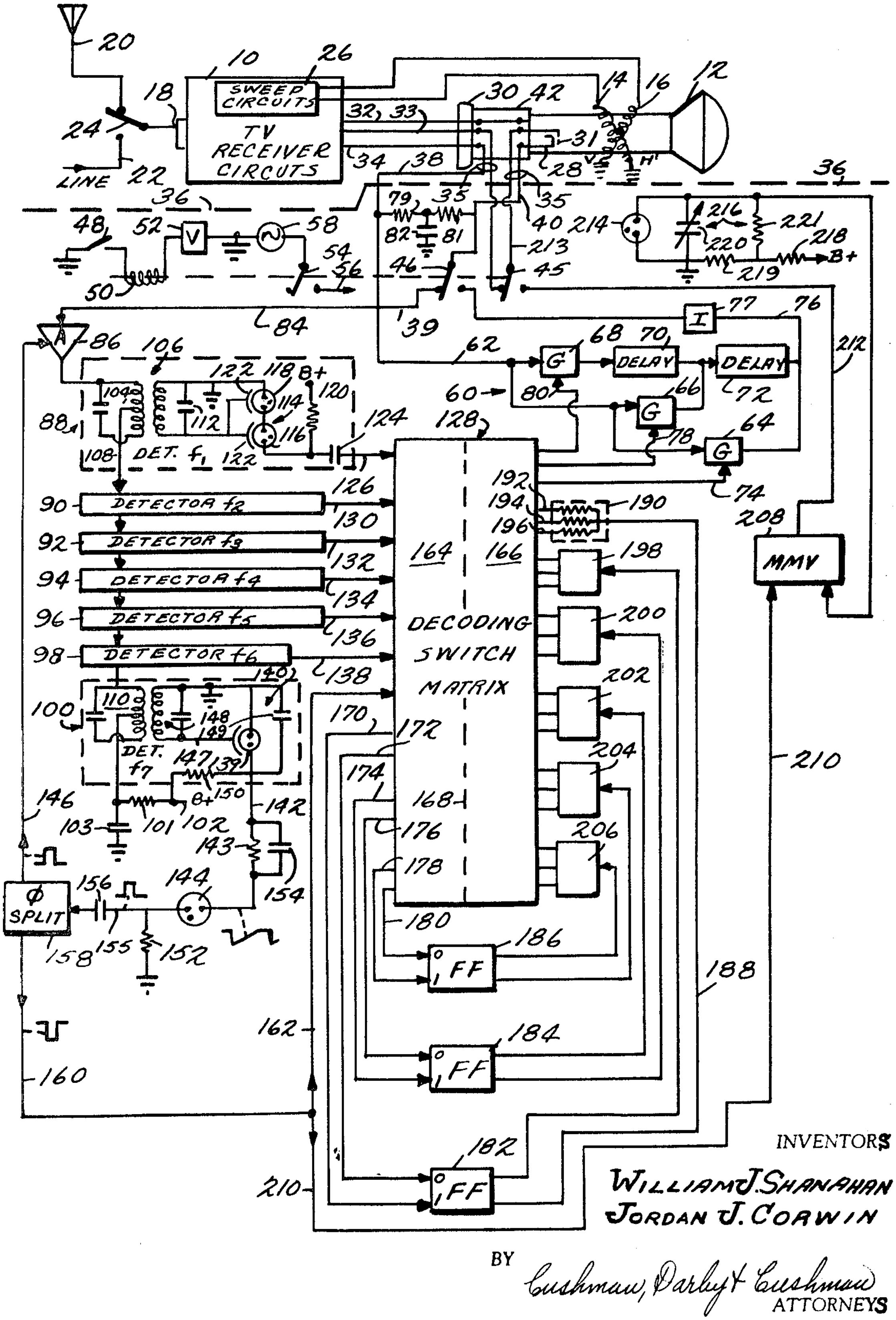
INVENTORS
WILLIAM J. SHANAHAN
JORDAN J. CORWIN
BY Cushman, Darby & Cushman
ATTORNEYS

DECODING SCRAMBLED TELEVISION

This invention relates to a scrambled intelligence signal communications system, and more particularly to a scrambled television decoder and installation thereof with a conventional television receiver.

The decoder herein described and claimed is particularly compatible with a television scrambling type transmitter such as that described and claimed in the co-pending application of Zopf and Shanahan, Ser. No. 85,917, filed even date herewith, although it may be as well employed in scrambled television systems which employ other forms of transmitters. In particular, the invention in some of its aspects need not be in a system in which the transmitter of the above mentioned application is employed.

One of the main features of this invention is that the decoder requires at most only a single pair of input lines and a single pair of output lines, no other direct connections to a conventional television receiver being essential. Further, all decoder input and output direct connections are made, in accordance with this invention, at the most accessible point in the receiver: the socket of the cathode ray tube. By virtue of this feature, one of the main disadvantages of prior art decoders is obviated. That is, with prior decoders, it is essential in installing same, to make connections within a television receiver, at several different points in order to obtain the necessary operating signals. In order to prevent complaints from owners of television receivers because of their general fear that the normal internal circuitry of their receiver might be hampered, and in order to meet underwriter's requirements, it is necessary that the decoder be fully insulated from any potentials which may be present in the television receiver, and that the number of interconnections thereto be kept at a minimum.

It is therefore the primary object of this invention, to eliminate the heretofore large number of connections necessary for coupling a decoder to a conventional television receiver.

Other features and objects of this invention include the connection of a scrambled television decoder to a conventional receiver by merely inserting between the usual cathode ray tube socket and the pin end of that tube, a socket adapter which effectively breaks the video signal input line normally connected directly to the beam intensity control element in the cathode ray tube. By such breaking, the adapter intercepts the video signals and applies them to the decoder for decoding purposes, and receives the decoded video signals for application back onto the beam intensity control electrode. When this electrode is the cathode of the cathode ray tube, it is desirable to have in the decoder a circuit which will maintain the DC brightness level of the video signals.

Still other features and objects of this invention are the generation of both vertical and horizontal blanking signals by circuitry in the decoder which needs no direct connection to the television receiver. For vertical blanking signals, this may be effected, when the decoder is employed in a system wherein a uniquely characterized signal is transmitted each vertical retrace interval, simply by detecting that signal and utilizing it to energize a blanking signal circuit. For horizontal blanking signals, a neon glow discharge tube or the like may be disposed internally of the television receiver cabinet in the radiation area of the electrostatic flyback pulse field produced by the conventional electromagnetic deflection yokes or coils, particularly the horizontal deflection coil. By connecting this neon tube in the circuit of a relaxation oscillator, horizontal blanking signals may be generated with proper phasing times.

Other features and objects of this invention will become more apparent by reference to the following description in connection with the drawing and the appended claims.

In the drawing, block 10 indicates television receiver circuits which along with an intelligence signal transducer such as cathode ray tube 12, and deflection coils 14 and 16, form a conventional television receiver such as might be found in any home. As illustrated, the receiver may have its normal input terminal 18 connected to an antenna 20, if such is needed, for receiving radiated video signals. In the alternative, the video signals may be coupled to input terminal 18, for closed circuit operation for example, by line 22 when switch 24 is in its downward position. As is conventional, sweep circuits 26 provide the necessary signals to the horizontal deflection coil 14 and vertical deflection coil 16 for controlling the sweep of the cathode ray beam emanating from cathode 28 in an electromagnetic deflection manner well known in the art.

Normally, there is a tube socket connected to the "pin" end or input terminals of the cathode ray tube. Such a socket is shown at 30, and it conventionally conveys operation potentials over line 32 from the receiver circuits to the cathode ray tube, along with the demodulated or detected video signals on line 34 to a modulation or intensity control such as the beam intensity control electrode of the cathode ray tube. In some television receivers, the beam intensity control electrode is the control grid, while in others it is the cathode. Either may be used with this invention, but as illustrated, it is preferred that the detected video signals be coupled to cathode 28. In such a case, grid 31 is normally connected directly to line 33 which is biased to a predetermined potential in the receiver circuits in conventional fashion.

The decoder of this invention is shown below dash line 36, and has a single pair of input lines 35 and a single pair of output lines 37, no other connecting lines to the receiver being necessary. The decoder is connected to the receiver preferably by use of a socket adapter 42 inserted between socket 30 and the pin end of the cathode ray tube, so that the video signals on line 34 are intercepted and extracted onto the decoder input line 38 with the video signals then from the decoder being present on line 40 for direct coupling to cathode 28. When the decoder is not in use, the video signals on line 38 are directly coupled back to line 40 via line 39 and relay switch 46 which is then leftwardly set as illustrated. At the same time, control grid 31 is connected to the receiver output line 33 via relay switch 45. To operate the decoder, a switch 48, which may be disposed externally on the decoder as it might be encased, may be depressed to cause the relay solenoid 50 to be actuated by a potential from source 52, which in turn causes relay switches 45, 46, and 54 to be set rightwardly. This allows a decoder operating potential to be available on line 56 from source 58. This potential may be employed in any desirable manner to provide the biases necessary in the decoder circuitry. The voltage for source 52 may be a battery, or preferably may be obtained from source 58 before switch 54.

When switch 48 is operated so as to cause switch 46 to be set in its rightward position, the video signals on line 38 are conveyed through the signal translating means 60 back to the decoder output line 40. As received at terminal 18, the picture signal components of the video signals are in any one of a plurality of various coded modes due to time shifting of the picture signals relative to periodically recurring synchronizing signal components in the video signal. These same picture and synchronizing signal components, after detection in the receiver circuits, appear on line 34, and consequently on line 38 and the input line 62 of the signal translating means. It is assumed that the picture signals may appear in any one of three different modes, i.e., with no time shifting relative to the synchronizing signals, with some time shifting, or with a second and greater amount of such time shifting. To compensate for this time shifting, the signal translating means includes gates 64, 66 and 68 along with delay units 70 and 72. Therefore, when signals on line 62 are prevented from passing through gates 66 and 68, but not through gate 64 because of an enabling signal on line 74, they appear on the signal translator output line 76 with no time shift effected relative to the synchronizing signals which operate sweep circuits 26. However, when only gate 66 is enabled by a signal on line 78, the video signals will pass through delay 72 to line 76, thereby giving those signals a given, small amount of time shift. Further, when only gate 68 is enabled by a signal on line 80, the video signals will be delayed an amount corresponding to the delay times of delay lines 70 and 72. The decoded video signals on line 76 pass through inverter 77 (which may have amplification properties if desired) and, as previously indicated, are directed via switch 46 to line 40, and thence to cathode 28 for a picture presentation thereof on the screen of the cathode ray tube 12.

Since it is desirable to maintain for cathode 28, the DC brightness level given to the video signals on line 34 by the conventional DC reinsertion circuits in the television receiver, and since that level may be lost in the video signal translator 60, means is provided in the decoder to maintain that level. In particular, this means comprises an integrator including resistors 79, 81, and condenser 82. When switch 46 is in its rightward or decoding position, the integrator passes the video signals to ground, but retains the DC voltage level thereof for line 40 thereby that level is reinserted or recombined with the decoded video signals from switch 46. In its leftward position, switch 46 shorts out the integrator to prevent grounding of any uncoded video signals. As exemplary, without limitation intended, resistors 79 and 81 may each be 33OK ohms while condenser 82 is 0.1 $\mu$f.

In order to get the enabling signals on lines 74, 78 and 80 to occur mutually exclusively so that only one of gates 64, 66 and 68 is enabled at a time, the following described circuitry may be employed. As indicated above, the present decoder is particularly useful in a scrambled television system in which the transmitter provides any number of a plurality of individual signals during each mode determining interval, for example during each vertical retrace period. These individual signals, in one embodiment, are characterized by having different frequencies, though they may be differently characterized as by amplitude differences, etc. As explained in the above mentioned Zopf et al. application Ser. No. 85,917, these individual signals are "tones" or frequency bursts which are timed at the transmitter to occur, if at all, respectively between adjacent post-horizontal synchronizing pulses in each vertical retrace interval. Also, as referred to in that application, the picture and blanking signals may be amplitude inverted, so the synchronizing signals when added there to are of sufficient amplitude then to rest on the inverted blanking signals at the pure white amplitude and extend through the picture signal amplitude range to their normal 100 percent modulation heighth. The tones or frequency bursts as mixed with the video signal and clipped at the transmitter are generally coextensive in amplitude with the synchronizing signals, so they likewise extend through the picture signal amplitude range in such a case. Consequently, picture and blanking signals which occur on line 34 from the television receiver circuits are amplitude inverted and include these different frequency tones as they occur during each vertical retrace period. Re-inversion of the picture signals to normal black for black and white for white, is accomplished by inverter 77, which of course may be in line 62 instead of line 76. Preferably it is not in line 38, however, because it is not desired to invert the tones too. From line 38, all of the video signals thereon, including the tone bursts, are coupled by line 84 to a gated amplifier 86, the output of which is applied to detectors 88, 90, 92, 94, 96, 98 and 100. The output signals from amplifier 86 may be coupled to detectors 88–100 in parallel, or as illustrated, the detectors may be serially connected via a resistor 101 bypassed to ground by condenser 103, to a source of B+ at terminal 102 for energization of the plate circuit of amplifier 86. Each of the detectors may be similarly constructed in accordance with the detailed illustration for the detector 88 or 100. In any case, as in detector 88, the output signals from amplifier 86 are connected to a tuned circuit 104 and coil of which may be the primary winding of a transformer 106. From the midpoint of the primary winding, there extends an output line 108 which is coupled to the next detector at its primary tuned circuits as shown for example for tuned circuit 110 in detector 100. The secondary winding of transformer 106, which preferably has a 3:1 turns ratio with respect to the primary winding, is also tuned by a condenser 112 thereacross, and the output of the secondary tuned circuit is coupled to a pulse forming circuit 114. As indicated in detector 88, this pulse former or generator may include two neon glow discharge tubes 116, 118, which are serially connected between ground and B+ via condenser charging resistor 120. The output from the secondary tuned circuit may be connected directly to the connection between the neon bulbs, or it may be coupled thereto by aluminum foil 122 wrapped around the bulbs. In any event, whenever the primary and secondary tuned circuits are at resonance, a sufficient output voltage is impressed on the neon bulbs to cause them to fire. This effects a discharge of condenser 124 which otherwise is charged by current through resistor 120. Accordingly, a pulse is generated and applied via line 126 to the decoding switch matrix 128. Neon bulbs 116 and 118 may be of the NE-2 type, for example.

Each of the detectors 88-100 is tuned to a different frequency, for example frequencies $f_1$–$f_7$, respectively, with both tuned circuits in any one detector being tuned to the same frequency, for detecting any occurrence of the respective individual signals which may be present during the vertical retrace intervals. As will be noted, detector 100 is similar in detail to detector 88 but employs only a single neon bulb 139 (still of the NE–2 type, for example) in its signal forming circuit 140, though it could as well use two as the other detectors can use one. Use of two neon bulbs instead of one provides for a larger voltage swing between "off" and "on" conditions. The outputs from detectors 90 – 98 are applied via lines 130, 132, 134, 136 and 138 to matrix 128, and as illustrated the output of detector 100 as it occurs on line 142 is DC coupled by resistor 143 to neon bulb 144.

As explained in the above mentioned copending application Ser. No. 85,917, a given one of the individual signals (tones or frequency bursts) may be made to occur during each mode determining interval, i.e., during each vertical retrace period. For a given program, this given individual signal has the same frequency, but from program to program, the frequency of this signal may be varied. Preferably, this individual signal which occurs during each vertical retrace interval, always occurs at the same time during each of such intervals, and further, is preferably always the last one of any of the individual signals to occur. That is, if there are seven different tones possible and seven (or nine, as in the above mentioned Zopf et al. application) post-horizontal "slots" in which the tones may occur with six of the tones occuring randomly, the other tone preferably occurs every vertical retrace interval in a predetermined one of those slots, and more preferably in the last one thereof. Since it always occurs at a given time, this tone signal, whether it occurs last or not, may be employed to enable and disable the gated amplifier 86 so that it is open substantially only during the time period in which any of the individual signals might occur during a vertical retrace interval. By so operating amplifier 86, the detectors are prevented from providing an output signal in response to picture intelligence signals which may be of frequencies similar to that to which one or more of the detectors is tuned. As will be later apparent, this gating of amplifier 86 prevents changing of the decoding pattern except during the mode determining intervals.

Assuming that the frequency burst to be employed for gating amplifier 86 has a frequency of $f_7$, the output of detector 100, when this frequency burst is received, causes a disabling signal on line 144 so that amplifier 86 is thereafter closed until near the beginning of the next mode determining interval. In particular, the signal forming circuit 140 is gated relaxation oscillator or sawtooth waveform generator. In the absence of the detection of a tone having an $f_7$ frequency, no signal is present on line 147 from the tuned secondary 148, so neon bulb 139 is then in a non-conductive condition. During such time, condenser 149 charges through resistor 150 from B+ at terminal 102. The resultant linearly rising voltage on line 142 eventually obtains an amplitude sufficient to fire neon bulb 144 (of the NE–96 type, for example), which in turn causes a sharp rise in voltage across its output resistor 152. This new voltage is maintained as long as bulb 144 remains firing, but that is only until a tone of frequency $f_7$ is detected. The detection of such a tone raises the voltage on line 147 in detector 100 considerably, causing bulb 139 to fire. This in turn effects a rapid discharge of condenser 149 and immediately lowers the voltage applied to bulb 144 below its extinguishing point. Condenser 154 across resistor 143 improves the fall time of the sawtooth wave as coupled to bulb 144. As soon as the $f_7$ tone subsides, condenser 149 begins charging again. The charging constants for that condenser are predetermined such that from the beginning of a charging time due to the ending of an $f_7$ tone in one vertical retrace interval, the charge builds up relatively slowly during the small remainder of that interval and during the next following vertical trace interval. It does not reach a potential sufficiently high to cause bulb 144 to fire until sometime before any tone could possibly arrive in the very next vertical retrace interval. Preferably, the parameters are set so that bulb 144 fires at, if not just slightly before, the beginning of that next vertical retrace interval. As soon as bulb 144 fires, the sawtooth flattens out, as illustrated, and stays relatively flat until the $f_7$ tone occurs in that next vertical retrace interval, so it may be approximately the last 5 (or less) to 10 percent of the sawtooth wave which effects the illustrated positive output pulse on line 155. This pulse may be, for example, approximately 1,000 microseconds in duration, and when coupled via condenser 156 and the phase splitter 158 to line 146, without inversion as illustrated, will enable amplifier 86 during its duration. During the absence of a pulse on line 155, which is at least during the whole of each vertical trace interval (except perhaps the last few lines thereof), amplifier 86 is disabled. Since normally the vertical retrace interval is 21 lines long, and since any frequency bursts which occur during each such interval occur fairly late therein, i. e., during the past-horizontal synchronizing portion of the interval, it is apparent the beginning of the flat portion of the sawtooth wave need not be sharply defined and that the flat portion may be reasonably wide without fear of any picture intelligence signals passing through amplifier 86. However, as above indicated, it is preferable to cause bulb 144 to fire just slightly, say one or two lines, before the beginning of each vertical retrace interval. It is not necessary to enable amplifier 86 so early, but when the pulse on line 155 is also effectively employed to generate a vertical blanking signal as later described, it is desirable to have the pulse start that early.

Phase splitter 158 also provides an output pulse which is the inversion of the pulse on line 155. The resultant negative pulse on line 160 may be directed via line 162 to the decoding switch matrix 128, along with the other detector output signals on lines 126, 130–138. The signal on line 162 may be employed via the matrix for any desired decoding purpose consonant with the transmitting coding.

In reality, matrix 128 is in effect two separate switching matrices, but for convenience is illustrated with two portions 164, 166 as divided in any exemplary manner by dash line 168. Either portion of the matrix may include a plurality of conventional variable switches set before hand in accordance with a given code, but each is preferably a portion of a coded card unique in its coding for the particular program instantly being viewed. More preferably, the decoding switch matrix 128 comprises a coded printed circuit card and card sensing means such as brushes for example as described in the Shanahan et al. U.S. Pat. No. 2,977,434. In any event, section 164 of the matrix routes the signals on the input lines from the detectors including line 162, in a predetermined manner to the output lines 170, 172, 174, 176, 178 and 180. These lines are connected as input lines to a respective plurality of stores, which in the instant example may be the "0" and "1" sides of flip-flops 182, 184 and 186. Conventional operation of the flip-flops is effected, i. e., a signal to the "0" side thereof effects a relatively high level input from the "0" store and a relatively low level output from the "1" store, while a signal applied to the input of the "1" store effects a reverse output level situation.

The output of each side of each flip-flop is coupled to at least one input of Section 166 of the decoding switch matrix. Preferably, each flip-flop output line is effectively divided into at least three sections by an isolating circuit, so that any flip-flop output line potential may be variously mixed with any of the other output line potentials by the particular routing then existing in the switch matrix portion 166, to form the actuating signals for the video signal translator 60 mutually exclusively on lines 74, 78 and 80. That is, as indicated for flip-flop output line 188, an insolation circuit 190 may be employed to divide the line into three sections 192, 194, 196 by respective resistors in circuit 190. Circuits 198, 200, 202, 204, and 206 may be similar to circuit 190 in that they may employ isolating resistors, but any of the isolating circuits may use diodes or neon bulbs, for example, instead of resistors.

As previously indicated, the outputs from the different isolating circuits are mixed in a predetermined manner by the instant routing effected by the decoding switch matrix, and the so mixed signals may be variously connected to form the actuating signals for enabling gates 64, 66 and 68. Since there are three flip-flops 182, 184, 186, each of which may effectively assume two different conditions, a total of eight signals combinations can be obtained therefrom. This means that, as described in the above mentioned copending application, four different signal levels are available for each of the lines 74, 78, 80, according to the connections made within section 166 of the matrix, and in accordance with the instant condition of each of the flip-flops. Various signals combinations can be routed to the lines 74, 78 and 80 by the matrix, and it is to be understood that the decoding effected in the matrix is such that gates 64, 66 and 68 are operated alternately with each, for example, being enabled only when the highest (or the lowest, if so desired) voltage level occurs on its enabling line.

In order to prevent the necessity of making connections internally of the receiver circuits 10 to obtain signals for blanking purposes, and particularly because it often happens that when the contrast control of the television receiver is turned up high the blanking signals are somewhat squashed to as not to appear to a sufficient degree in the video signals as it occurs in the output of inverter 77, it is desirable to manufacture vertical and horizontal cutoff blanking signals in the decoder itself which signals may be employed for the usual purpose of cutting of cathode ray tube operation during respective retrace times. For vertical blanking, this may be easily obtained by connecting the output of circuit 158, as present on line 160, in the form of a negative pulse to a blanking circuit such as monostable multivibrator 208 via line 210. The leading edge of this pulse triggers the multivibrator to its unstable state with the remainder of the pulse holding it there. When the pulse ends the multivibrator changes back to its stable state after a given time determined by the delay time of the multivibrator. This delay time is so set that the end of the generated blanking signal, as that signal occurs in a negative pulse form on line 212, corresponds to the end of the vertical retrace time. By virtue of the multivibrator output being coupled by line 212 and switch 46 to line 213 and grid 31, the resultant blanking of the cathode ray screen during each vertical retrace interval prevents any of the tones or other signals in the video signal from appearing as white marks across the screen during the vertical retrace interval. As an alternative, the output of multivibrator 208 may be coupled with opposite polarity, to cathode 28 via relay switch 46 to effect the desired blanking, in which case the control grid 31 can be connected directly to line 33 instead of through the decoder or it can be connected by a relay switch to the output of inverter 77.

To obtain sub-interval or horizontal blanking signals of course the horizontal flyback pulse in the television receiver circuits may be directly employed, but in an effort to prevent the necessity of making connections within those circuits, the horizontal blanking waveform is generated by electrostatic induction. That is, the neon glow discharge tube 214 is disposed in the radiation area of the electrostatic field from the horizontal deflection yoke 14, so that when the radiated field therefrom occurs due to the normal flyback of the conventional sawtooth signal driving that yoke, a sufficient breakdown voltage is electrostatically induced momentarily across the neon bulb causing it to conduct. The radiated flyback pulse may be in the order of 1,000 volts, but of course only a fractional part of that voltage is effectively coupled to the Neon bulb itself. However it has been found that there is sufficient voltage present to fire the bulb, especially when it is, for example, of the NE–2 type. Bulb 214 is employed as the discharging device of a relaxation oscillator or sawtooth generator which otherwise includes the integrator or resistor-condenser network 216. Resistor 218 and 219 as coupled between B+ and ground at a potential divider to maintain the voltage across bulb 214 below its firing point in absence of a radiated flyback pulse. During each horizontal trace time, condenser 220 is charged substantially linearly by current through resistor 221, to effect a rising sawtooth waveform, which as a sharp negative drop when tube 214 fires and discharges the condenser. Condenser 220 as therefore cyclically charged and discharged once on horizontal interval.

The sawtooth signal is conveyed to monostable multivibrator 208 over line 223 and may be AC, though preferably DC, coupled thereto, and is preferably clamped at its lowest voltage level to ground, all by means not shown. While the negative pulse on line 210 may be coupled to one grid (or like element) in the multivibrator for vertical blanking purposes, the positive sawtooth pulse on line 223 may be coupled to the other grid therein to effect a horizontal blanking signal on line 212 of the same polarity as the vertical blanking pulses thereon. This is accomplished by allowing the positively rising portion of the sawtooth signal on line 223 to trigger multivibrator 208 to its unstable state slightly before the end of its positive sweep, say 5 percent before, by properly setting the multivibrator biasing requirements and phasing the input signal thereto by adjusting the capacitance of condenser 220. When the inherent delay time passes multivibrator 208 returns to its stable state ending the horizontal blanking signal. The output of the multivibrator is consequently timed to coincide with the normal horizontal blanking signal. From the foregoing, it is apparent that the radiated flyback pulse which occurs during any one horizontal blanking interval is employed to generate the blanking signal for the next horizontal blanking interval.

Though it is preferred to generate the vertical blanking signal in response to a tone as above described, it too may be generated if desired in a manner similar to the generation of the horizontal blanking signal. That is, the vertical blanking signal may be generated in response to a radiated vertical flyback pulse by using a relaxation oscillator with a neon bulb discharge device disposed near the vertical yoke. However the radiated vertical flyback pulse is of much less voltage than its horizontal counterpart, and it sometimes becomes difficult to make a neon bulb fire reliably in response to it regardless of how close the bulb is positioned to the vertical yoke.

Thus it is apparent that this invention successively achieves the various objects and advantages herein set forth.

Modifications of this invention not described herein will become apparent to those of ordinary skill in the art after reading this disclosure. Therefore, it is intended that the matter contained in the foregoing description and the accompanying drawing be interpreted as illustrative and not limitative, the scope of the invention being defined in the appended claims.

What is claimed is:

1. A decoder in combination with a video receiving means for use in a scrambled intelligence signal communications system in which video and synchronizing signals are variously shifted relative to each other to cause scrambled intelligence signals, wherein said receiving means includes an intelligence signal transducer having a modulation control to which said intelligence signals are normally conveyed by a given line and further has sweep circuits responsive to said synchronizing signals for developing signals to sweep said intelligence signals in said transducer, and unscrambling circuitry unconnected to said receiving means except by a direct connection to said control for intercepting the intelligence signals on said given line and unscrambling those signals independently of the said synchronizing signals and presenting the unscrambled signals directly to said control.

2. A decoder for use in a scrambled intelligence signal communications system with a receiving means which includes an intelligence signal transducer having a modulation control to which intelligence signals are conveyed by a given line and having deflection means which produce an electrostatic field, comprising unscrambling circuitry connected to said control and given line for intercepting the intelligence signals normally presented directly to said modulation control, unscrambling those signals and presenting the unscrambled signals to said control, and means for generating transducer cutoff signals in response to the electrostatic field from the said deflection means.

3. A decoder as in claim 2 wherein the cutoff signal generating means comprises a relaxation oscillator including a cyclically chargeable device and means for discharging that device each time the electrostatic field attains at least a given magnitude.

4. A decoder as in claim 3 wherein said discharging means includes a neon glow discharge tube.

5. A decoder as in claim 2 for use as aforesaid when the transducer is a cathode ray tube and the modulation control therefor is the cathode of said tube, and further including means in said decoder and coupled between the said given line and control for maintaining on the output line the DC brightness level of the video signal as present on said given line.

6. A decoder as in claim 2 for use as aforesaid when the transducer has means separated from said control for utilizing said cutoff signals, and further including output line for coupling said cutoff signals to the last mentioned means.

7. A decoder for use in a scrambled intelligence signal communications system with a receiving means which includes an intelligence signal transducer having at least two input terminals the first of which may be used to control transducer modulation in response to intelligence signals normally received on a given line and the second of which may be biased to cutoff transducer operation, comprising a single pair of decoder output lines for respective connection to said input terminals, means, including a decoder input line for intercepting scrambled intelligence signals on said given line, for unscrambling the intercepted signals and presenting the unscrambled intelligence signals to a first of said output lines whereby the unscrambled signals may be connected to said first terminal, and means at least partially in the decoder for generating on the other output line cutoff signals which may be connected to said second terminal.

8. A decoder as in claim 7 for use as aforesaid when the second input terminal is normally connected by a second given line to a predetermined biasing potential, and further including a second decoder input connected to said second line, a first switch for connecting the said first output line directly to the first mentioned decoder input line or thereto via said unscrambling means, and a second switch for connecting the said second output line to said generating means or to said second input line.

9. A decoder as in claim 7 for use as aforesaid when the transducer is a cathode ray tube having its cathode connected to said first terminal and its grid connected to said second terminal, wherein the unscrambling means includes means for providing unscrambled intelligence signals suitable for controlling cathode ray modulation when connected to said cathode, and wherein the generating means includes means for providing blanking signals suitable for effectively cutting of the cathode ray when connected to said grid.

10. A decoder for use in a scrambled intelligence signal communications system of the type in which any number two or greater of a plurality of individual signals each with a different predetermined identifying characteristic may be serially transmitted during each of spaced mode determining intervals for signifying at least in part the instant coded mode of the intelligence signals and in which for at least a multiplicity of such intervals a given one of said individual signals is always present at a given time within each such interval, comprising gating means receiving said individual signals when occurring, a plurality of detectors coupled to said gating means and respectively characterized to identify said individual signals, means responsive to the detection of said given individual signal for enabling and disabling said gating means respectively during and between each of said intervals, and means responsive to the outputs of at least certain of said detectors for unscrambling the coded modes of the intelligence signals.

11. A decoder as in claim 10 wherein each of said individual signals is of a different predetermined frequency, and wherein each of said detectors includes a circuit tuned to a different one of said frequencies and pulse generating means coupled to the output of the tuned circuit for producing a pulse when that circuit senses an individual signal having a frequency to which that circuit is tuned.

12. A decoder as in claim 10 wherein the enabling and disabling means includes a continually charging device dischargeable by said detected given signal and operative upon attaining a predetermined charge near the beginning of each interval to enable said gating means and operative upon being discharged near the end of each of said intervals to disable said gating means until at least the beginning of the next of said intervals.

13. A decoder as in claim 12 wherein said device includes a relaxation oscillator.

14. A decoder as in claim 13 wherein the relaxation oscillator includes a neon glow discharge tube.

15. A decoder as in claim 12 and further including means responsive to the output of the enabling and disabling means for generating during each of said intervals a blanking signal of duration embracing at least the time period during which any of said individual signals might occur.

16. A decoder for use in a scrambled television system of the type in which any number two or greater of a plurality of individual signals each with a different predetermined identifying characteristic may be serially transmitted during each of spaced mode determining intervals for signifying at least in part the instant coded mode of the video signals and in which for at least a multiplicity of such intervals a given one of said individual signals is always present at a given time within each such interval, comprising gating means receiving said individual signals when occurring, a plurality of detectors coupled to said gating means and respectively characterized to identify said individual signals, means responsive to the detection of said given individual signal for generating a blanking signal during each of said intervals, and means responsive to the outputs of at least certain of said detectors for unscrambling the coded modes of the video signals.

17. A decoder as in claim 16 wherein the blanking signal generator effects a blanking signal which is at least coextensive with the time period during which any of said individual signal may occur during each of said intervals.

18. A decoder for use in a scrambled television system of the type in which any number two or greater of a plurality of individual signals each with a different predetermined identifying characteristic may be serially transmitted during each of spaced mode determining intervals for signifying at least in part the instant coded mode of the video signals and in which for at least a multiplicity of such intervals a given one of said individual signals is always present at a given time within each such interval, comprising gating means receiving said individual signals when occurring, a plurality of detectors coupled to said gating means and respectively characterized to identify said individual signals, means responsive to the detection of said given individual signal for generating a blanking signal during each of said intervals, means responsive to the outputs of at least certain of said detectors for unscrambling the coded modes of the video signals, wherein the blanking signal generator effects a blanking signal which is at least coextensive with the time period during which any of said individual signals may occur during each of said intervals, and means associated with said decoder and sensitive to the electrostatic field radiated by a television receiver's deflection means for generating a multiplicity of sub-interval blanking signals between each of said mode determining intervals.

19. A decoder as in claim 18 wherein the last mentioned generating means includes a relaxation oscillator having a neon glow discharge tube which is sensitive to said field.

20. In a scrambled television decoder usable with a receiver which has deflection means radiating an electrostatic field, the improvement of means disposable in the electrostatic field radiation area of said deflection means for generating signals in response to rapid changes in the said field, and means responsive to said signals for generating blanking signals.

21. Apparatus as in claim 20 wherein said disposable means includes a neon glow discharge tube and the generating means comprises a relaxation oscillator with said glow tube being a component part thereof.

22. Apparatus as in claim 20 including means for phasing the blanking signals.

23. A decoder for use, in a scrambled television system of the type in which any number of a plurality of individual signals each with a different predetermined identifying characteristic may be serially transmitted during each of spaced mode determining intervals for signifying at least in part the instant coded mode of the video signals, with a television receiver which includes a cathode ray tube having a beam intensity control electrode to which picture signals are conveyed by a given line, said decoder comprising an input line connected to said given line, an output line connected to said control electrode, and unscrambling circuitry for exacting onto said input line the video signals normally presented directly to said beam intensity control electrode of said cathode ray tube, unscrambling the video signals, and presenting the unscrambled signals via said output line to said control electrode; said unscrambling circuitry comprising video signal translating means coupled between said input and output lines and operative in response to a plurality of actuating signals to change the mode of said video signals, means coupled to said input line for detecting during each mode determining interval any of said individual signals then present in the video signal, a plurality of signal stores, means for routing the detected signals to said stores in a predetermined manner, and means for mixing the outputs of said stores in a predetermined manner to form said actuating signals mutually exclusively.

24. A decoder as in claim 23 for use with a cathode ray tube which has electromagnetic deflection means, and further including means disposable in and responsive to electrostatic field from said deflection means for generating a signal in response to each radiated electrostatic field flyback pulse, and means responsive to each such signal for generating a blanking signal.

25. A decoder as in claim 24 for use in a scrambled television system of the type aforesaid wherein a given one of said individual signals always occurs in each of a multiplicity of successive ones of said intervals at a given time which is later in each such interval than the occurrence of any other of said individual signals, and further including gating means coupled between said input line and detecting means, and means coupled to the output of the detecting means which detects said given individual signal for enabling said gating means substantially only during each of said intervals thereby preventing detection of any signal on said input line except those occurring during the times said gating means is enabled.

26. A decoder as in claim 25 and further including means responsive to the output of said enabling means for providing to said cathode ray tube during each of said intervals a blanking signal which is at least coextensive with the time period within which any of said individual signals may occur.

27. A decoder as in claim 26 for use in a system as aforesaid wherein the receiver cathode ray tube has electromagnetic deflection means, and further comprising means including a relaxation oscillator having a glow discharge tube disposable in the electrostatic field radiation area of said deflection means for generating for said tube a multiplicity of spaced blanking signals between each of said intervals.

28. A decoder as in claim 27 for use with a cathode ray tube which has its cathode employed as said beam intensity control electrode, and further including means in the decoder between said input and output line for maintaining on said output line the DC brightness level of the video signals as present on said input line.

29. A decoder as in claim 38 and further including a switch for connecting said video signal translating means in series with said input and output lines and alternatively for coupling the said input and output lines together without the translating means in series therewith.

30. A method of connecting a scrambled television decoder to television receiver means including synchronizing signal generator means and picture presentation means with an intensity control, comprising the steps of intercepting the normal video signal input line at its point where it is directly connected to said intensity control, and inserting said decoder serially between said intercepted line and intensity control including connecting said decoder directly to said intensity control and making no connection of said decoder to said synchronizing signal generator means.

31. A method of connecting a scrambled television decoder to television receiver means including picture presentation means with an intensity control and deflection means capable of radiating an electrostatic field and said decoder has its own blanking signals generator system including an electrostatic field sensitive device coupled to the decoder output, comprising the steps of intercepting the normal video signal input line to said intensity control, inserting said decoder serially between said line and intensity control, and placing said device in the electrostatic field radiation area of said deflection means for causing generation of blanking signals in accordance with rapid changes in the said field.

32. A method of connecting a scrambled television signal decoder which has a blanking signal generating means including a neon glow discharge tube, to a television receiver which has a cathode ray tube, a socket connected to said tube for coupling certain signals including detected video signals to said tube, and electromagnetic deflection means for said tube, comprising the steps of disposing said neon glow discharge tube in the electrostatic field radiation area of said deflection means whereby blanking signals may be generated, and inserting a socket adapter between said socket and tube for coupling said blanking signals to the latter and for directing the said video signals into said decoder and then therefrom to said tube.

* * * * *